June 23, 1964 H. HENZE 3,138,343

FISHING REELS

Filed April 25, 1962

INVENTOR.
HENRY HENZE
BY
B.T.Wobensmith
ATTORNEY

United States Patent Office 3,138,343
Patented June 23, 1964

3,138,343
FISHING REELS
Henry Henze, % Penn Fishing Tackle Mfg. Co., 3028 W.
Hunting Park Ave., Philadelphia 32, Pa.
Filed Apr. 25, 1962, Ser. No. 190,159
3 Claims. (Cl. 242—84.1)

This invention relates to fishing reels and more particularly to improved ratchet mechanism therefor.

It has heretofore been proposed to provide ratchets operating in one or both directions of rotation of the reel drum, but these have required manual release.

It is the principal object of the present invention to provide a fishing reel having a ratchet pawl which is manually movable to operating position for one direction of rotation of the drum or spool and which is moved to a released or retracted position upon rotation in the opposite direction.

It is a further object of the present invention to provide a ratchet of the character aforesaid which is simple and positive in its action but has a minimum of working parts.

It is a further object of the present invention to provide a fishing reel ratchet mechanism mounted on one of the frame plates of the reel and readily manually set to operating position.

It is a further object of the present invention to provide a fishing reel ratchet mechanism which is released and retracted upon rotation of the drum shaft in a predetermined direction.

Other objects and advantageous features of the invention will be apparent from the description and claims.

The nature and characteristic features of the invention will be more readily understood from the following description, taken in connection with the accompanying drawings forming part thereof, in which.

Figure 1:
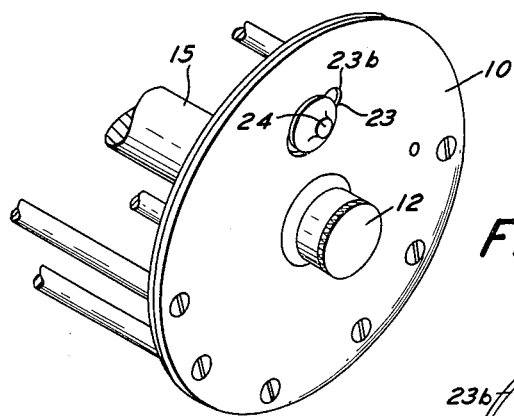
FIGURE 1 is a fragmentary perspective view of a portion of a fishing reel in accordance with the invention.
Figure 4:
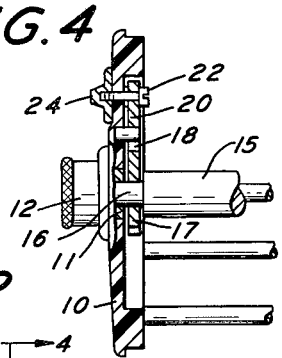
FIG. 4 is a vertical sectional view taken approximately on the line 4—4 of FIGURE 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIGS. 1 to 4 of the drawings, in the embodiment of the invention therein illustrated, an end frame plate of a fishing reel is shown at 10 which may be of any desired material, such as cast plastic, hard rubber or metal, and with an internally threaded bearing supporting sleeve 11 carried therein for the reception of a shaft end cap bearing 12.

A drum or spool shaft 15 has an end portion 16 supported in the bearing 12, the shaft 15 being supported at its other end in any desired manner. The shaft 15, inwardly of the end portion 16, has a ratchet wheel 17 secured thereto for rotation therewith, the ratchet wheel 17 having a plurality of teeth 18.

A ratchet pawl 20 is provided having an enlarged mounting end 21 through which a pawl pivot pin 22 extends. The pin 22 extends through a slot 23 formed in the end plate 10 and is in threaded engagement in an exteriorly accessible operating button 24.

The slot 23 is elongated and positioned so that its outer end or released portion 23b is further from the center of the pivotal axis of the shaft 15 than its inner end or operating portion 23a and is angularly offset with respect to a radius through the inner portion 23a.

The slot 23, along the innermost side thereof can have a cam projection 25, which separates the operating portion 23a from the released portion 23b.

The pawl 20 has a ratchet tooth engaging tongue 26 and along its inner edge has a recessed portion 27 for normal tooth engaging action of the pawl tongue 26, and a recessed portion 28 for pawl retention in retracted position. A cam projection 29 is provided to aid in the selective engagement of the portion 27 of the portion 28 with a ratchet stop and positioning pin 30.

The pawl 20, between the pivot pin 22 and the recessed portion 27, has one end of a tension spring 31 connected thereto. The opposite end of the spring 31 is connected to a spring abutment screw 32 mounted in the end plate 10.

The mode of operation will now be pointed out.

Upon movement of the button 24 to move the pivot pin 22 so that it is at the operating portion 23a of the slot 23, the axis of the pin 24, the axis of the shaft 15 and the center of the pin 30 are in alignment.

Figure 2:
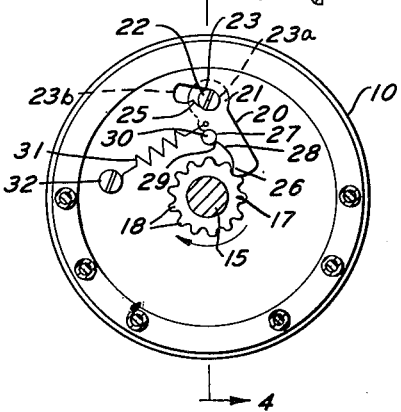
FIG. 2 is a vertical sectional view taken just inside the end frame plate shown in FIGURE 1 and illustrating the ratchet mechanism in one of its operating positions.
Figure 3:
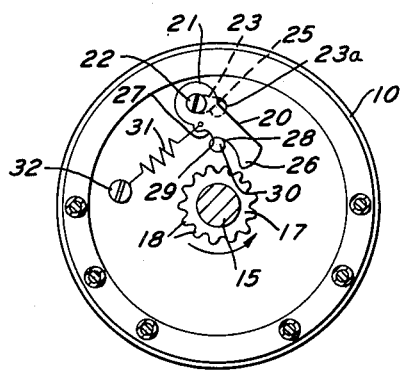
FIG. 3 is a view similar to FIGURE 2 showing the ratchet mechanism in its retracted position.

The spring 31, in the normal operating position of the pawl 20 and upon clockwise movement of the shaft 15 as seen in FIGURE 2, urges the tooth engaging tongue 26 into successive engagement in the spaces between the teeth 18, and urges the recessed portion 27 into engagement with the stop pin 30. An audible clicking action is thus provided, with an accompanying restraint applied through the pawl 20 as determined by the spring rate of the spring 31.

If, now, the direction of movement of the shaft 15 is reversed, a force is applied by one of the teeth 18 against the tongue 26 which urges the pawl 20 and the pivot pin 22 in a counter clockwise direction. This force, acting in opposition to the force of the spring 31 which tends to retain the recessed portion 27 in engagement with the pin 30, causes the cam projection 29 to ride over the pin 30 and seat the recessed portion 28 on the pin 30. After the peak of the projection 29 has moved over pin 30 the spring 31 aids further movement of the pawl 20 to retracted position. The elongation of the slot 23 permits the movement of the pivot pin 22 to its released position, the cam projection 25 also first resisting and then aiding the movement to retracted position in a manner similar to that of the cam projection 29.

The pawl 20 is thus snapped to an out of action or retracted position without the necessity for the user shifting the button 24 to its released position. The user, if he desires, can manually release the pawl 20 by movement of the button 24 to bring the pivot pin 22 to the release portion 23b of the slot 23.

When it is desired to again engage the ratchet pawl 20 this may be readily affected by movement of the button 24 along the slot 23 to its inner position 23a. This movement over the projections 25 and 29 is first opposed and then aided by the spring 31 in a reversal of the releasing or retracting action previously explained.

Figure 5:
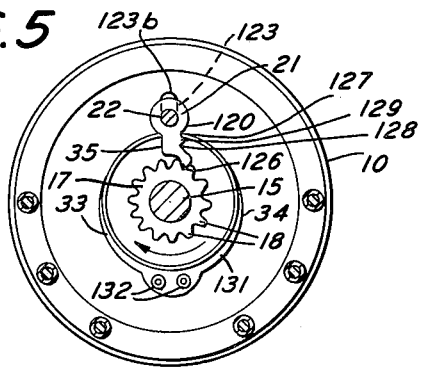
FIG. 5 is a view similar to FIGURE 2 showing another embodiment of the invention with the ratchet mechanism in its operating position.
Figure 6:
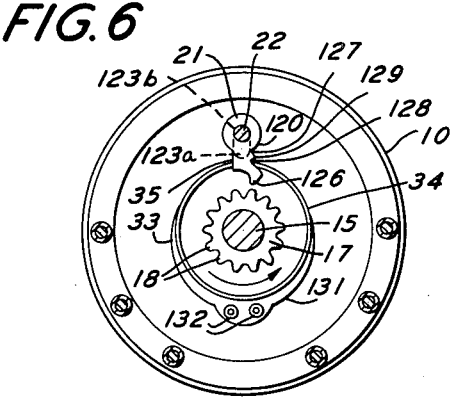
FIG. 6 is a view similar to FIGURE 5 showing the ratchet mechanism in its retracted position.

Referring now more particularly to FIGS. 5 and 6 the end frame plate 10 has a shaft 15 carried thereby as before. The shaft 15 has a ratchet wheel 17 secured thereto with teeth 18.

A ratchet pawl 120 is provided with a mounting end 21 on a pin 22. A radially extending elongated slot 123 is provided in the frame plate 10 having an inner operating part 123a and an outer operating part 123b. The pawl 120 has a ratchet tooth engaging tongue 126 which is offset with respect to the radial center line of the slot 123.

The pawl 120, on one side thereof, has a recessed portion 127 for normal tooth engaging action of the pawl tongue 126 and a recessed portion 128 for pawl retention in released position. A cam projection 129 is provided between the recessed portions 127 and 128.

A spring 131 is provided, secured to the end plate 10 by screws 132 and has two curved arms 33 and 34. The arm 34 has its terminal end selectively in engagement in the recessed portion 127 or the recessed portion 128 and the other arm 33 has its terminal end in engagement with the opposite edge 35 of the pawl 120.

The mode of operation is similar to that previously described.

Assuming that the pivot pin 22 has been moved inwardly to position the pawl 120 for normal operation, upon clockwise movement of the shaft 15, as seen in FIGURE 5, the tooth engaging tongue 126 is urged by the action of the spring 131 into successive engagement in the spaces between the teeth 18. The spring 131 resists the turning movement of the pawl 120 as this successive engagement occurs and tends to restore the pawl 120 to the position shown in FIGURE 5.

If the direction of movement of the shaft 15 is reversed, a force is applied against the tongue 126 moving the pawl 120 and the pin 22 outwardly in the slot 123. This is resisted by the spring 131 until the peak of the cam projection 129 is forced past the terminal end of the spring arm 34 whereupon the spring 131 assists in completing the outward movement.

The pivot pin 22 can, as before, be moved inwardly for resetting or when in its inner position can be manually retracted, if desired.

I claim:

1. In a fishing reel having an end frame member and a shaft rotatably mounted with respect to the end frame member, a ratchet mechanism comprising a ratchet wheel carried by said shaft, a pawl having a tongue for engagement with said ratchet wheel, a pivotal mounting member for said pawl, said frame having an elongated slot angularly disposed with respect to a radius through the rotational axis of the shaft and with inner and outer portions for the reception of said pivotal mounting member, a longitudinally extensible resilient member connected at one end to said frame and at the other end to said pawl and urging said tongue into engagement with said ratchet wheel when said pivotal mounting member is at the inner portion of said slot, and members including said resilient member and said ratchet wheel for moving said pawl to a retracted position with said pivotal mounting member at the outer portion of said slot.

2. A fishing reel as defined in claim 1 in which the pawl has a cam projection on one side margin thereof, said frame member has a fixed abutment member thereon for selective engagement on opposite sides of said cam projection, and said resilient member provides a snap actuation of said cam projection with respect to said fixed member.

3. A fishing reel having an end frame member and a shaft rotatably mounted with respect to the end frame member, a ratchet mechanism comprising a toothed ratchet wheel carried by said shaft, a pawl having a tongue for engagement with said ratchet wheel, a mounting member for said pawl having a portion accessiorly of said end frame member, said end frame member having an elongated slot angularly disposed with respect to a radius through the rotational axis of the shaft and in which said mounting member is slidably mounted, said slot having an inner portion for the reception of said mounting member in pawl to ratchet wheel engaging position and an outer portion for the reception of said mounting member in pawl retracted position, a coil spring connected at one end to said frame member and at the other end to said pawl intermediate its ends and urging said tongue toward said ratchet wheel, said pawl having a cam projection on one side margin thereof, an abutment carried by said frame plate at a fixed location for selective positioning of said cam projection with respect thereto, said pawl in one position engaging said ratchet wheel and in another position being held in retracted position by engagement with said abutment.

References Cited in the file of this patent
UNITED STATES PATENTS

| | | |
|---|---|---|
| 996,348 | Kramer | June 27, 1911 |
| 2,633,308 | Zientowski | Mar. 31, 1953 |